Apr. 17, 1923. 1,452,114
J. O. GRENIER
DIRECTION INDICATOR FOR AUTOMOBILES AND OTHER VEHICLES
Filed Dec. 24, 1921

INVENTOR
JOHN. OSCAR. GRENIER.
By Fetherstonhaugh & Co
ATTYS

Patented Apr. 17, 1923.

1,452,114

UNITED STATES PATENT OFFICE.

JOHN OSCAR GRENIER, OF VANCOUVER, BRITISH COLUMBIA, CANADA.

DIRECTION INDICATOR FOR AUTOMOBILES AND OTHER VEHICLES.

Application filed December 24, 1921. Serial No. 524,731.

*To all whom it may concern:*

Be it known that I, JOHN OSCAR GRENIER, of the city of Vancouver, in the Province of British Columbia, Canada, lineman, have invented certain new and useful Improvements in Direction Indicators for Automobiles and Other Vehicles, of which the following is the specification.

This invention relates to improvements to direction indicators for automobiles and other vehicles and is designed to indicate to traffic officers, pedestrians and drivers of other vehicular traffic when the driver of the vehicle to which it is attached intends to turn his car or truck and it consists essentially of a casing adapted to be secured to an automobile or other vehicle and having an orifice at one end, an indicating hollow translucent member normally located within the casing and movable means under the control of the driver for carrying the member through the orifice to an exposed position, means for automatically illuminating the interior of the hollow member when brought to the exposed position and means for automatically returning the member to the normal position and simultaneously extinguishing the illumination as hereinafter more particularly explained.

The device may be displayed on any convenient portion of the vehicle though it will preferably be mounted on one of the front fenders.

Figure 1:
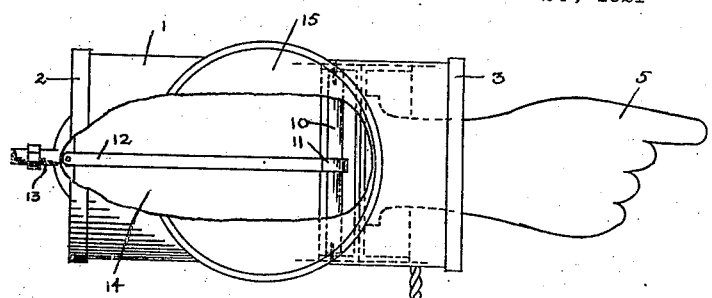
Fig. 1 is a side view of my indicator.
Figure 2:
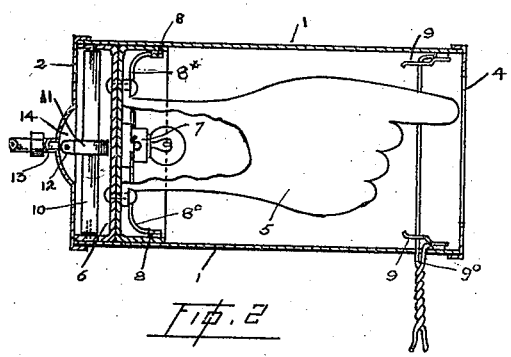
Fig. 2 is a longitudinal section.

Referring to Figures 1 to 5 inclusive.

1 indicates a casing oval in cross section having an end closure 2 which is secured in an airtight manner, and an opposite end closure 3 provided with an aperture 4 through which the indicator 5 passes to an exposed position.

6 is a piston slidably mounted within the casing 1.

5 is an indicating member extending from the front face of the piston 6 and in the form of a hollow body of glass or other translucent material which body is preferably made in the shape of a hand as shown and is painted inside either white or red as desired.

7 is a lamp socket secured to the front of the piston 6 within the hollow member 5.

8 are insulated contacts carried by the piston 6 and to which the lead wires 8× and 8° extend from the lamp socket 7.

9 are stationary insulated contacts carried by the casing 1 and to which circuit wires 9× and 9° are connected.

When the piston 6 is at the outer extremity of its stroke the contacts 8 engage the insluated contact fingers 9 closing the circuit through the lamp in the socket 7 illuminating it. The wires 9× and 9° are suitably energized from the lighting circuits of the vehicle.

10 is a spring roller mounted at the rear of the piston and with its longitudinal axis vertical. The spring roller 10 is substantially similar in mechanism to a self acting blind roller.

11 is a metallic tape wound around the centre of the roller 10 one end of said tape being attached to the roller and the outer end 12 being attached to the end 3 of the casing 1 substantially as shown.

13 is a connection made into the centre of the end closure 2 to which is screwed a union for attachment to the air tube leading to the engine.

Attached to the engine in any convenient position either in the cylinder head or on the exhaust manifold, is a two way valve operated by a pull wire, this valve is connected by a tube to the connection 13 of my device.

Having described the principal parts involved in my invention I will briefly describe the operation of the same.

On the valve being opened by the driver a portion of compressed vapour from the engine passes through the tube and connections developing a pressure in the space 14 which drives the piston 6 endwise towards the end 3 and the indicating member 5 through the aperture 4 into its exposed position for indicating drawing the tape off the roller 10 which is rotated winding its spring into tension.

When the engine valve is reversed the pressure in the space 14 is relieved and the roller 10 by reason of its spring in tension winds up the tape 11 and returns the piston to its normal position.

Figure 6:
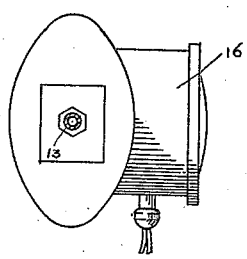
Fig. 6 is an end view showing a modification with a tail lamp incorporated in the structure.

On the side of the casing 1 is placed a reducing mirror 15 facing to the rear of the car and in a modification a tail lamp 16 with ruby glass may be used as shown in Fig. 6.

Figure 7:
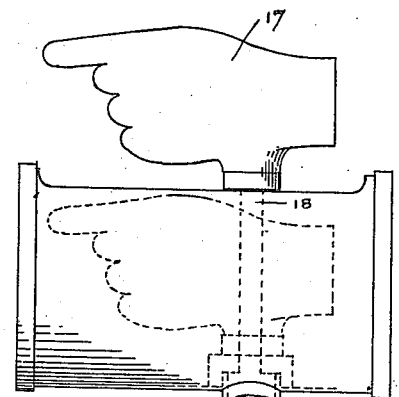
Fig. 7 is a side view showing a modified means of display for operating my indicator.
Figure 3:
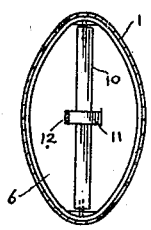
Fig. 3 is a cross section showing the back or power side of the piston.
Figure 4:
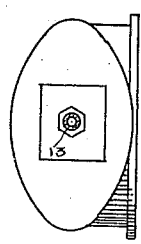
Fig. 4 is an end view showing the air line connection.
Figure 5:
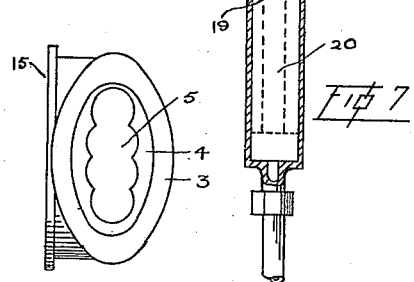
Fig. 5 is an end view showing the aperture from which the indicator emerges.

A modification of the indicating mechanism is shown in Fig. 7 in which 17 is an indicating member 18 is a piston rod on the upper end of which the member 17 is carried. 19 is a piston secured to the rod 18 and 20 is a cylinder or casing in which the piston operates.

From this description it will be seen that I have devised a very efficient signal device for automobiles or like vehicles which is simple in construction and quick in operation.

What I claim as my invention is:

1. A direction indicator comprising an elongated tubular casing having one end closed and provided with an air inlet, a piston having a sliding fit in said casing and adapted to be moved toward the open end of the casing by the air admitted into the latter, a pointer carried by the piston adapted to be concealed within the casing in the retracted position of the piston, and means for limiting the movement of the piston toward the open end of the casing comprising a roller mounted in the casing adjacent the closed end thereof, and a web wound on the roller and having its free end attached to the said piston.

2. A direction indicator for vehicles comprising a tubular casing, a plate closing one end of said casing and provided with a central offset affording a recess at the inner side of the plate, said offset portion being formed with an aperture for the admission of fluid pressure into the casing, a roller mounted in the casing in proximity to said plate, a web wound on said roller, a piston slidable in the casing, said web being attached at its free end to the piston, and a pointer carried by the said piston.

JOHN OSCAR GRENIER.